United States Patent [19]

Atoji et al.

[11] 4,314,274

[45] Feb. 2, 1982

[54] DIGITAL COLOR CORRECTION METHOD

[75] Inventors: Hitomi Atoji; Mitsuhiko Yamada, both of Kyoto, Japan

[73] Assignee: Dainippon Screen Seizo Kabushiki Kaisha, Kyoto, Japan

[21] Appl. No.: 123,736

[22] Filed: Feb. 22, 1980

[30] Foreign Application Priority Data

Feb. 28, 1979 [JP] Japan .................. 54-21938

[51] Int. Cl.³ .............................................. H04N 1/46
[52] U.S. Cl. ................................................... 358/80
[58] Field of Search ........................................ 358/80

[56] References Cited

U.S. PATENT DOCUMENTS 3,600,505  8/1971  Dobouney ............................. 358/80
3,801,736  4/1974  Kosaka et al. ........................ 358/80

Primary Examiner—Richard Murray
Attorney, Agent, or Firm—Zarley, McKee, Thomte, Voorhees & Sease

[57] ABSTRACT

A method for carrying out a color correction in a digital manner in a picture reproducing machine such as a color scanner, a color facsimile, or the like, which is capable of saving a large volume of capacity of a memory, wherein a resultant value obtained from a combination of color separation signals which are obtained by scanning photoelectrically a color original picture, is represented in a plane coordinate system, and wherein the coordinates of the resultant value are transformed in order to correct hue and saturation by operating the color separation signals together with factors predetermined, thereby obtaining a combination of color-corrected color separation signals.

5 Claims, 18 Drawing Figures

DIGITAL COLOR CORRECTION METHOD

BACKGROUND OF THE INVENTION

This invention relates to a method for carrying out a color correction in a digital manner in a picture reproducing machine such as a color scanner, color facsimile, or the like, which is capable of saving a large volume of the capacity of a memory used therein.

In a color printing, when color separation printing plates are made, color separation signals obtained by scanning an original picture are generally color-corrected in order to remove inconveniences according to the hue differences among color printing inks and the gradation differences of halftone dots produced by means of halftone screens, and the like.

For instance, in a conventional picture reproducing machine such as a color scanner, or the like, the color correction is performed in an analog system, wherein the hue of the original picture is divided, for instance, into six color signals for violet, magenta, orange, yellow, green and cyan. Then, from the six color signals are obtained four color signals for cyan C, magenta M, yellow Y, and black Bk, which control the amounts of the color printing inks for each printing plate.

This method, however, has defects such as lack of stability of the processing circuits, limited color correction variable range, and so forth.

In order to remove these defects, a digital computer system having a memory is proposed, and it has advantages such as wide correction variable range, convenience of operation, simple construction, high quality printing and rapid operation. In this case, in general, an original color picture is scanned to obtain three (red, green, and blue) color separation signals R, G and B. These three color separation signals are sent to a color operation circuit, thereby finally obtaining recording signals for density of printing inks, such as cyan C, magenta M, yellow Y, and black Bk.

In order to provide the most accurate possible color reproduction, a combination of the amounts of cyan, magenta, and yellow inks (the black ink, and so forth, are omitted for the sake of brevity of explanation) is necessarily determined corresponding to a combination of red, green, and blue color separation signals.

Consequently, for the purpose of color correction by selecting the combination of cyan, magenta, and yellow values corresponding to the combination of red, green, and blue values, the color-corrected combinations of cyan, magenta, and yellow values corresponding to each combination of red, green, and blue values are stored in a memory in advance, and then, the color-corrected combination of cyan, magenta, and yellow values is read out by addressing the memory by the combination of red, green and blue values corresponding thereto.

If each red, green, and blue range is divided into, for example, two hundred tone steps, altogether $200^3 = 8,000,000$ combinations of cyan, magenta, and yellow values must be stored in the memory, which requires that the memory has a large capacity. Therefore, in practice, in order to reduce the storage capacity required for the memory, the tone steps to be divided are reduced to a manageable level, and intermediate values are properly interpolated between each two tone steps in the three-dimensional space defined in the memory by the three axis of red, green and blue. However, this method still requires the memory having a large capacity. This means high cost, and thus is not practicable.

SUMMARY OF THE INVENTION

It is an object of the present invention to provide a method for carrying out a color correction in a digital manner free from the abovementioned defects which does not require the three-dimensional space and is simple and convenient in operation and simple in construction.

According to the present invention there is provided a method for carrying out a color correction in a digital manner, comprising the steps of representing a resultant value corresponding to a combination of color separation signals obtained by scanning photoelectrically a color original picture, in a plane coordinates system, and transforming the coordinates of the resultant value in order to correct hue and saturation corresponding to the combination of the color separation signals by operating the color separation signals, thereby obtaining a combination of color-corrected color separation signals.

BRIEF DESCRIPTION OF DRAWINGS

In order that the present invention may be better understood, preferred embodiments thereof will now be described with reference to the accompanying drawings, in which.

DESCRIPTION OF PREFERRED EMBODIMENTS

Figure 1:
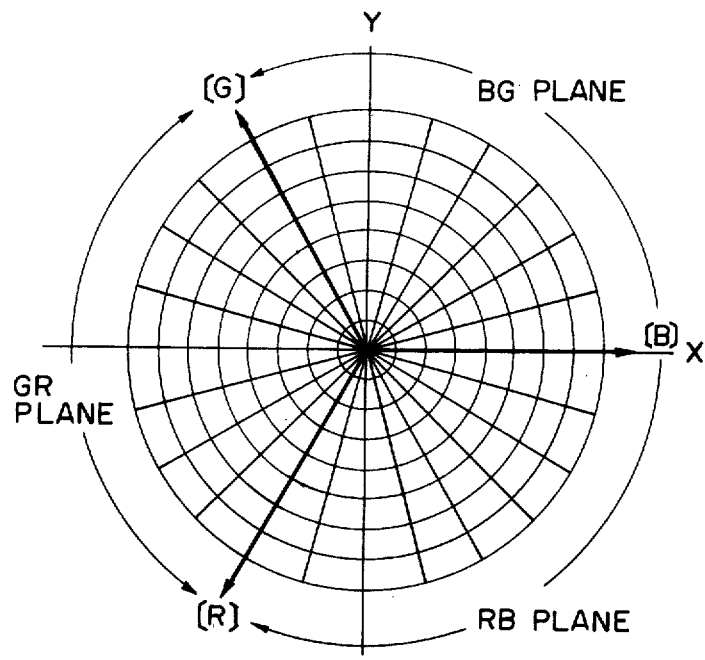
FIG. 1 shows a coordinates system used in a method according to the present invention.

Referring now to the drawings, there is shown in FIG. 1 a circular polar coordinates system on an X-Y rectangular plane coordinates system. It is divided in a circumferential direction into three equal sectors by three radial axes [B], [G] and [R] for red, green and blue, the three axes extending radially from the center, and the axis [B] being coincident with the +X axis, and is also divided in equal distance into eight parts by concentric circles, and each sector, i.e. BG, GR or RB plane is further divided into eight equal sectors by seven radial lines, thereby obtaining 192 small area parts. That is, the hue is divided twenty-four steps and the saturation is divided into eight steps.

When strengths of color separation signals obtained by scanning photoelectrically an original picture are expressed as lengths from the center, i.e. three vectors, along the three axes [B], [G] and [R] in the polar coordinates, and then the three vectors are added to obtain a resultant vector, the orientation and the size of the resultant vector indicate the hue and the saturation corresponding to the combination of the color separation signals. Accordingly, in practice, the hue and the saturation of the combination of the color separation signals can be known by discriminating one of the 192 small area parts divided in the polar coordinates, in which the tip of the resultant vector obtained by operating the combination of the color separation signals, is located. Hence, the hue and the saturation corresponding to the combination of the color separation signals may be determined by the ratio among them.

Figure 2:
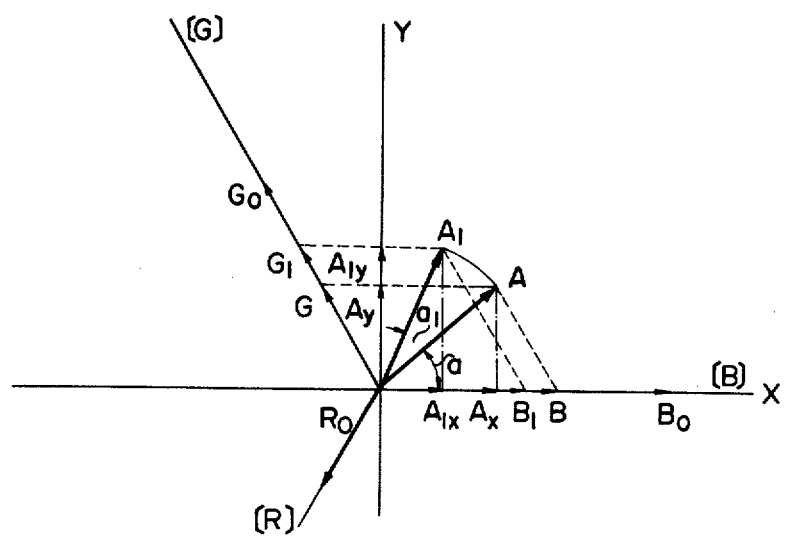
FIGS. 2 and 3 show an enlarged coordinates system in FIG. 1, for explaining the principle of a color correction according to the present invention.

In FIG. 2 are shown three vectors corresponding to color separation signals Bo, Go and Ro picked up, extending from the center along the axes [B], [G] and [R] in the polar coordinates. When Ro is minimum (MIN), if (Bo-MIN), (Go-MIN) and (Ro-MIN) are expressed as B, G and R which is zero in this case, the resultant vector A obtained from the vectors Bo, Go and Ro is the sum of the vectors B and G because R is zero. The orientation of the vector A with respect to the $+X$ axis, i.e. an angle a which is measured counterclockwise from $+X$ axis represents the hue corresponding to the combination of Bo, Go and Ro, and the size of the vector A represents the saturation corresponding to the same. As shown in FIG. 2, since Bo is larger than Go and Go is larger than Ro, the resultant vector A is located in BG plane.

Consequently, the color correction of the hue and the saturation can be made by varying the angle and the size of the vector A, or transforming the coordinates of the same. Now, when the vector A is pivoted to the position of vector $A_1$ through an angle $a_1$ from the angle a, as shown in FIG. 2, the vectors or color separation signals B and G are changed to $B_1$ and $G_1$, thereby converting the hue. If the size of the vector A is varied, the color separation signals B and G are changed, thereby converting the saturation.

Thus, by varying the angle and the size of the vector A or transforming the coordinates of the same in the same time, the differences of the hue and the saturation between the original picture and the reproduction picture can be corrected, while the color separation signals Bo, Go and Ro and the amounts of the inks are varied.

According to the method of the present invention, the color correction is performed by carrying out the operation of the color separation signals together with factors predetermined as hereinafter described, depending on the hue and the saturation corresponding to the combination of the color separation signals picked up.

In order to carry out this method, first which plane BG, GR or RB the resultant vector A corresponding to the combination of the color separation signals Bo, Go and Ro is positioned in is discriminated by detecting the minimum value of the color separation signals Bo, Go and Ro, and the angle a and the size of the resultant vector A are obtained by operating the color separation signals Bo, Go and Ro. Then, a small area part wherein the tip of the vector A is positioned is discriminated by the angle a and the size of the vector A, as hereinafter described in detail in connection with FIGS. 6 and 7. Then, the factors which are stored in an address corresponding to the small area part of the memory are read out by using the angle a and the size of the vector A as addressing signals, and the color separation signals Bo, Go and Ro together with the factors read out are operated, thereby obtaining a combination of color-corrected color separation signals Bo', Go' and Ro'.

The operating method of the angle a and the size of the vector A, the factors to be stored in the memory, and so forth, will be described.

The discrimination of the plane BG, GR or RB wherein the vector A is located is conducted by detecting the minimum value of the color separation signals. For example, when the vector A is positioned in BG plane, as shown in FIG. 2, assuming that unit vectors in the X and the Y directions are i and j, the vector $\overline{A}$ ($\overline{A}=\overline{B}+\overline{G}+\overline{R}$, $|\overline{B}|=B$, $|\overline{G}|=G$, and $|\overline{R}|=R$) is expressed in the following formula.

$$\overline{A} = Ax \cdot i + Ay \cdot j \qquad (1)$$

Ax and Ay are shown in the followings:

$$Ax = B - \cos\frac{\pi}{3} \cdot G = B - \tfrac{1}{2} \cdot G = A\cos a \qquad (2)$$

$$Ay = \cos\frac{\pi}{6} \cdot G = \frac{\sqrt{3}}{2} \cdot G = A\sin a$$

Therefore, $$a = \tan^{-1}\frac{Ay}{Ax} = \tan^{-1}\frac{\sqrt{3} \cdot G}{2B - G} \qquad (3)$$

Further, the size of the vector A is indicated in the following formula.

$$A = \sqrt{Ax^2 + Ay^2} = \sqrt{(B - \tfrac{1}{2}G)^2 + \left(\frac{\sqrt{3}}{2}G\right)^2} = \sqrt{B^2 - BG + G^2} \qquad (4)$$

From the angle a and the size of the vector A one of the small area part wherein the tip of the vector A is positioned, is discriminated.

Then, supposing that the vector $A_1$ is obtained by correcting the hue of the vector A corresponding to the color separation signals Bo, Go and Ro, i.e. the vector A is pivoted through the angle $a_1$ in FIG. 2, the vector $\overline{A_1}$ is represented in the following formula.

$$\overline{A_1} = A_1x \cdot i + A_1y \cdot j \qquad (5)$$

Since the size of the vector A is not changed, the following formula should be realized.

$$A = |\overline{A}| = |\overline{A_1}| = A_1 \qquad (6)$$

As clearly shown in FIG. 2, $A_1x$ and $A_1y$ are expressed as follows.

$$A_1x = B_1 - \tfrac{1}{2}G_1 \qquad (7)$$

$$A_1y = \frac{\sqrt{3}}{2} G_1$$

Meanwhile, $$A_1x = A_1\cos(a + a_1) = A_1\cos a \cdot \cos a_1 - A_1\sin a \cdot \sin a_1 \quad (8)$$

$$A_1y = A_1\sin(a + a_1) = A_1\sin a \cdot \cos a_1 + A_1\cos a \cdot \sin a_1$$

From the formulae (2), (6) and (8), $A_1x$ and $A_1y$ are resulted in the following formulae.

$$A_1x = \left(B - \tfrac{1}{2}G\right)\cos a_1 - \tfrac{\sqrt{3}}{2} \sin a_1\right) = \qquad (9)$$

$$B\cos a_1 - G\left(\tfrac{1}{2}\cos a_1 + \tfrac{\sqrt{3}}{2} \sin a_1\right)$$

$$A_1y = \tfrac{\sqrt{3}}{2} G\cos a_1 + \left(B - \tfrac{G}{2}\right) \sin a_1\right) =$$

$$B\sin a_1 + G\left(\tfrac{\sqrt{3}}{2} \cos a_1 - \tfrac{1}{2}\sin a_1\right)$$

From the formulae (7) and (9), $B_1$ and $G_1$ are obtained as follows.

$$B_1 = B\left(\cos a_1 + \tfrac{1}{\sqrt{3}} \sin a_1\right) - \tfrac{2}{\sqrt{3}} G\sin a_1 \quad (10)$$

$$G_1 = \tfrac{2}{\sqrt{3}} B\sin a_1 + G\left(\cos a_1 - \tfrac{1}{\sqrt{3}} \sin a_1\right)$$

When the vector A is positioned in GR plane, Ax, Ay, a, A, $G_1$ and $R_1$ are obtained in the same manner as described above.

$$A_x = -\left(G\cos\tfrac{\pi}{3} + R\cos\tfrac{\pi}{3}\right) = -\tfrac{1}{2}(G + R) = A\cos a \quad (11)$$

$$A_y = G\cos\tfrac{\pi}{6} - R\cos\tfrac{\pi}{6} = \tfrac{\sqrt{3}}{2}(G + R) = A\sin a$$

$$a = \tan^{-1}\tfrac{\sqrt{3}(R - G)}{G + R} \quad (12)$$

$$A = \sqrt{G^2 - GR + R^2} \quad (13)$$

$$G_1 = G\left(\cos a_1 + \tfrac{1}{\sqrt{3}} \sin a_1\right) - R\tfrac{2}{\sqrt{3}} \sin a_1 \quad (14)$$

$$R_1 = \tfrac{2}{\sqrt{3}} G\sin a_1 + R\left(\cos a_1 - \tfrac{1}{\sqrt{3}} \sin a_1\right)$$

When the vector A is positioned in RB plane, Ax, Ay, a, A, $R_1$ and $B_1$ are obtained in the same manner as described above.

$$Ax = B - R\cos\tfrac{\pi}{3} = B - \tfrac{1}{2}R = A\cos a \quad (15)$$

$$Ay = -R\cos\tfrac{\pi}{6} = -\tfrac{\sqrt{3}}{2} R = A\sin a$$

$$a = \tan^{-1}\tfrac{\sqrt{3} R}{R - 2B} \quad (16)$$

$$A = \sqrt{B^2 - BR + R^2} \quad (17)$$

-continued $$R_1 = R\left(\cos a_1 + \tfrac{1}{\sqrt{3}} \sin a_1\right) - B\tfrac{2}{\sqrt{3}} \sin a_1 \quad (18)$$

$$B_1 = R\tfrac{2}{\sqrt{3}} \sin a_1 + B\left(\cos a_1 - \tfrac{1}{\sqrt{3}} \sin a_1\right)$$

The saturation of the hue-corrected value $A_1$ corresponding to the combination of $B_1$, $G_1$ and $R_1$ is then corrected by multiplying the factor C to the value $A_1$, thereby resulting a combination of color-corrected color separation signals $B_{out}$, $G_{out}$ and $R_{out}$, as follows.

$$B_{out} = Cb \cdot B_1 \quad (19)$$

$$G_{out} = Cg \cdot G_1$$

$$R_{out} = Cr \cdot R_1$$

Figure 3:
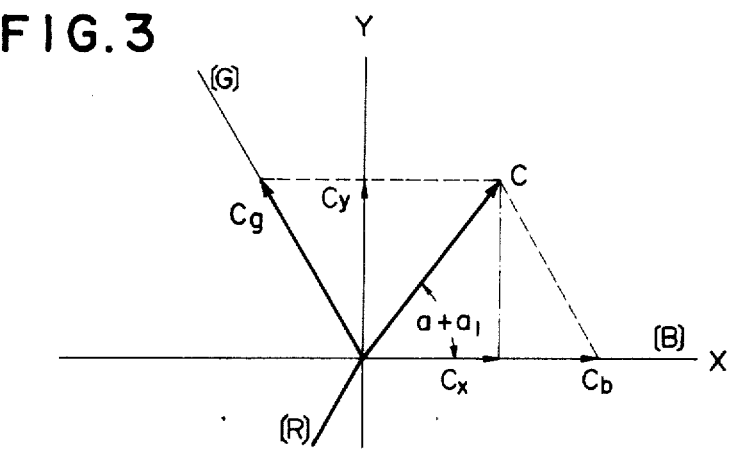

In these formulae Cb, Cg and Cr mean component factors of blue, green and red in [B], [G] and [R] axes, as shown in FIG. 3.

The vector $\overline{C}$ equals the sum of $\overline{C}b$, $\overline{C}g$ and $\overline{C}r$ ($|\overline{C}b|=\overline{C}b$, $|\overline{C}g|=\overline{C}g$, and $|\overline{C}r|=\overline{C}r$). If the minimum value of the three components is zero, vector $\overline{C}$ is the sum of the components $\overline{C}b$ and $\overline{C}g$ when the vector $\overline{C}$ is positioned in BG plane. When the vector $\overline{C}$ is positioned in GR or RB plane, the vector $\overline{C}$ is the sum of $\overline{C}g$ and $\overline{C}r$ or $\overline{C}r$ and $\overline{C}b$.

As clearly shown in FIG. 3, when $A_1$ is positioned in BR plane, if the X and the Y components of the vector $\overline{C}$ are denoted to Cx and Cy and the unit vectors in the X and the Y directions are i and j, the vector $\overline{C}$ is expressed in the following formula.

$$C = Cx \cdot i + Cy \cdot j$$

Then, the components Cx and Cy are as follows.

$$Cx = C\cos(a + a_1) \quad (20)$$

$$Cy = C\sin(a + a_1)$$

and $$Cx = Cb - \tfrac{1}{2}Cg \quad (21)$$

$$Cy = \tfrac{\sqrt{3}}{2} Cg$$

From the X and the Y components Cx and Cy in the formulae (20) and (21), the components Cb and Cg are obtained as follows.

$$Cb = Cx + \tfrac{1}{\sqrt{3}} Cy = C\left[\cos(a + a_1) + \tfrac{1}{\sqrt{3}} \sin(a + a_1)\right] \quad (22)$$

$$Cg = \tfrac{2}{\sqrt{3}} Cy = \tfrac{2}{\sqrt{3}} C\sin(a + a_1)$$

When $A_1$ is positioned in GR plane, the components Cg and Cr are obtained in the same manner as described above.

$$Cg = -Cx + \frac{1}{\sqrt{3}} Cy = -C\left[\cos(a + a_1) - \frac{1}{\sqrt{3}} \sin(a + a_1)\right] \quad (23)$$

$$Cr = -Cx + \frac{1}{\sqrt{3}} Cy = -C\left[\cos(a + a_1) + \frac{1}{\sqrt{3}} \sin(a + a_1)\right]$$

When $A_1$ is positioned in RB plane, the components Cr and Cb are also obtained in the same manner as above.

$$Cr = -\frac{2}{\sqrt{3}} Cy = -\frac{2}{\sqrt{3}} C\sin(a + a_1) \quad (24)$$

$$Cb = Cx - \frac{1}{\sqrt{3}} Cy = C\left[\cos(a + a_1) - \frac{1}{\sqrt{3}} \sin(a + a_1)\right]$$

Thus the obtained results are tabulated in Table 1.

TABLE 1

| | BG plane | GR plane | RB plane |
|---|---|---|---|
| a | $\tan^{-1}\frac{\sqrt{3}\,G}{2B-G}$ | $\tan^{-1}\frac{\sqrt{3}\,(R-G)}{G+R}$ | $\tan^{-1}\frac{\sqrt{3}\,R}{R-2B}$ |
| A | $\sqrt{B^2 - BR + G^2}$ | $\sqrt{G^2 - GR + R^2}$ | $\sqrt{R^2 - RB + B^2}$ |
| $B_1$ | $B\left(\cos a_1 + \frac{1}{\sqrt{3}} \sin a_1\right) - G\frac{2}{\sqrt{3}} \sin a_1$ | | $B\left(\cos a_1 - \frac{1}{\sqrt{3}} \sin a_1\right) + R\frac{2}{\sqrt{3}} \sin a_1$ |
| $G_1$ | $G\left(\cos a_1 - \frac{1}{\sqrt{3}} \sin a_1\right) + B\frac{2}{\sqrt{3}} \sin a_1$ | $G\left(\cos a_1 + \frac{1}{\sqrt{3}} \sin a_1\right) - R\frac{2}{\sqrt{3}} \sin a_1$ | |
| $R_1$ | | $R\left(\cos a_1 - \frac{1}{\sqrt{3}} \sin a_1\right) + G\frac{2}{\sqrt{3}} \sin a_1$ | $R\left(\cos a_1 + \frac{1}{\sqrt{3}} \sin a_1\right) - B\frac{2}{\sqrt{3}} \sin a_1$ |
| Cb | $C\left[\cos(a+a_1) + \frac{1}{\sqrt{3}} \sin(a+a_1)\right]$ | | $C\left[\cos(a+a_1) - \frac{1}{\sqrt{3}} \sin(a+a_1)\right]$ |
| Cg | $\frac{2}{\sqrt{3}} C\sin(a + a_1)$ | $-C\left[\cos(a+a_1) - \frac{1}{\sqrt{3}} \sin(a+a_1)\right]$ | |
| Cr | | $-C\left[\cos(a+a_1) + \frac{1}{\sqrt{3}} \sin(a+a_1)\right]$ | $-\frac{2}{\sqrt{3}} C\sin(a + a_1)$ |

The values B, G and R in Table 1 are obtained by subtracting the minimum value (MIN) of the color separation signals Bo, Go and Ro from each color separation signals Bo, Go and Ro. In practice, the factors to be multiplied to the value B, G and R may be revised in advance corresponding to the minimum value thereof and then the revised factors may be multiplied to the color separation signals Bo, Go and Ro.

Figure 4:
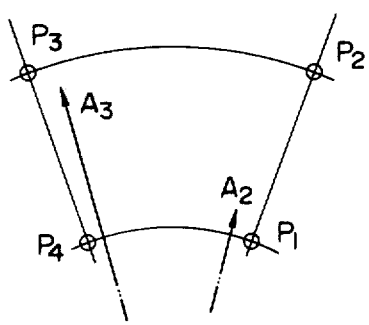
FIG. 4 shows a small area part divided of the coordinates system in FIG. 1.

In FIG. 4 is shown one small area part $P_1P_2P_3P_4$ of 192 parts divided, which includes two tips of the vectors $A_2$ and $A_3$ whose hues and saturations are somewhat different one from another. In this case, in order to perform more faithful and precise color-correction, such intermediate values in one small area part may properly be interpolated. A conventional interpolation method for this will be described with reference to FIG. 5. Now the small area part $P_1P_2P_3P_4$ in FIG. 4 is assumed to be a square $P_1P_2P_3P_4$ positioned in coordinates (0,0), (0,1), (1,1) and (1,0), in FIG. 5. Each vertex $P_1$, $P_2$, $P_3$ or $P_4$ has a value U(0,0), U(0,1), U(1,1) or U(1,0). A value $U(d_1, d_2)$ of a point P positioned in coordinates $(d_1,d_2)$ in the square is obtained by the interpolation.

Two intersects $P_{12}$ and $P_{34}$ of a parallel straight line with the line $P_2P_3$, which passes through the point P with the lines $P_1P_2$ and $P_3P_4$ have values $U(0,d_2)$ and $U(1,d_2)$ which are calculated in the following formulae.

$$U(0,d_2) = U(0,0) - d_2[U(0,0) - U(0,1)] \quad (25)$$

$$U(1,d_2) = U(1,0) - d_2[U(1,0) - U(1,1)] \quad (26)$$

From the two formulae (25) and (26) the value $U(d_1,d_2)$ of the point P is obtained as follows.

$$U(d_1,d_2) = U(0,0) - d_2[U(0,0) - U(0,1)] - d_1\{[U(0,0) - U(1,0)] - d_2[U(0,0) - U(0,1)] + d_2[U(1,0) - U(1,1)]\} \quad (27)$$

Hence, since the coordinates $d_1$ and $d_2$ are known by the angle a and the size of the vector A, as described above, and the values corresponding to U(0,0), U(0,1), U(1,0) and U(1,1) are stored in the memory in advance, the intermediate values of the point in the small area part can be readily interpolated, as occasion demands.

Figure 6:
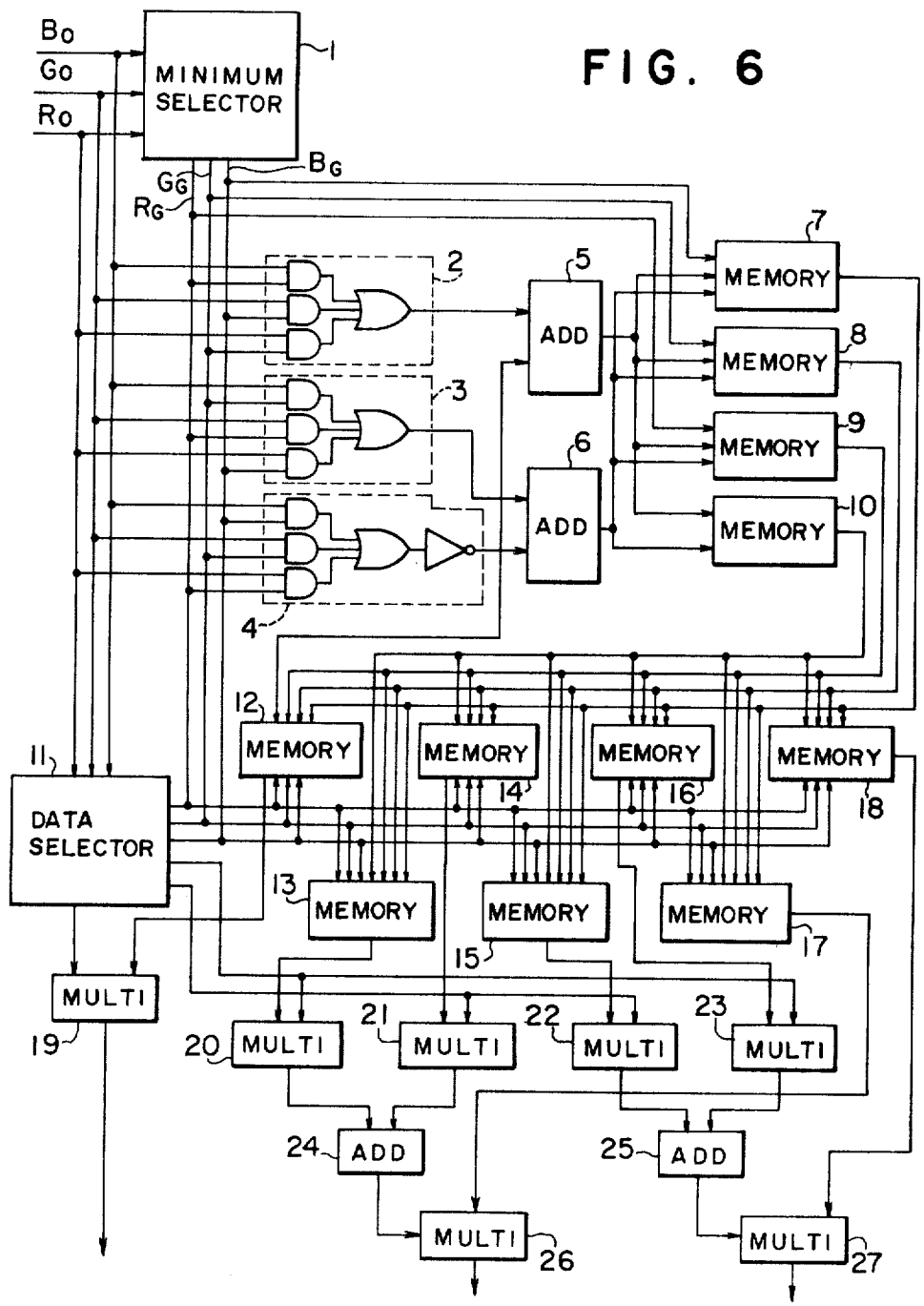
FIG. 6 is a schematic view of an electric circuit for the method of the present invention.

In FIG. 6, there is shown a block diagram of an electric circuit for carrying out the method according to the present invention.

The color separation signals Bo, Go and Ro picked up, which are converted into digital signals in an analog-digital converter (not shown), are fed to a minimum value selector circuit 1 and a data selector circuit 11 comprising a plurality of gates and OR circuits.

Figure 7:
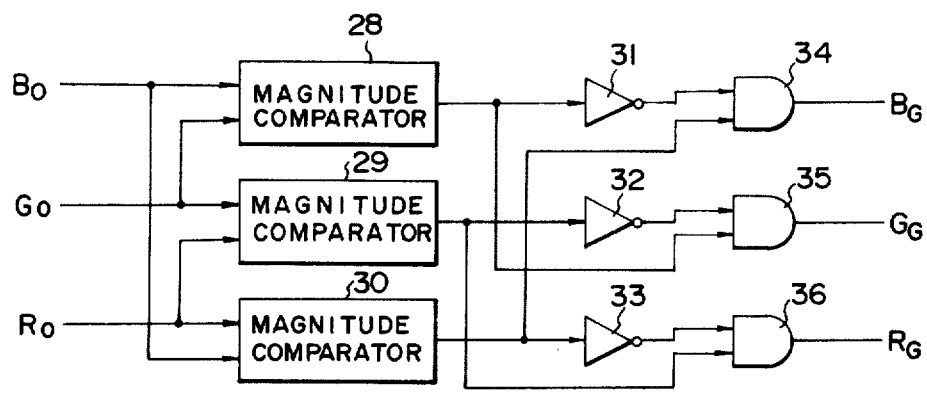
FIG. 7 is a schematic view of a minimum value selector circuit in FIG. 6

An embodiment of the minimum value selector circuit 1 is shown in FIG. 7, and comprises three magnitude comparators 28, 29 and 30; inverters 31, 32 and 33; and gates 34, 35 and 36. In this minimum value selector circuit 1, the plane BG, GR or RB wherein the vector A is positioned, is discriminated. In each magnitude comparator 28, 29 or 30, the strengths of the signals Bo and Go; Go and Ro; or Ro and Bo are compared, and each maginitude comparator 28, 29 or 30 outputs a high level signal H or a low level signal L when Bo is larger than Go or Go is larger than Bo, when Go is larger than Ro or Ro is larger than Go, or when Ro is larger than Bo or Bo is larger than Ro.

When the maginitude comparator 28 and 30 output the low level signal L and the high level signal H, i.e. Go is larger than Bo and Ro is larger than Bo, the signals Bo of the minimum value is discriminated, that is, the vector A is positioned in the GR plane, and the gate 34 outputs a gate signal Bg. When the vector A is positioned in the plane RB or BG, the gate 35 or 36 outputs a gate signal Gg or Rg in the same manner as described above.

The color separation signals Bo, Go and Ro are sent to signal selector circuits 2, 3 and 4, in which the color separation signals predetermined are selected depending on the gate signal and the selected signals are output from the signal selector circuits 2, 3 and 4.

When the signal Bo is the minimum, and the gate signal Bg is output from the minimum value selector circuit 1, the signal selector circuit 2, 3 and 4 output the signals Bo, Ro and inverted Bo. These signals are so fed to adders 5 and 6, as Go and the inverted Bo to the adder 5, and Ro and inverted Bo to the adder 6. In each adder 5 or 6, the operation of Go=Go−Bo or R=Ro−Bo is performed.

While the results G and R are input as address signals into memories 7, 8 and 9, the gate signal is input as a tip select signal into one of the memories 7, 8 and 9, for utilizing the one thereof. In each memory 7, 8 or 9, angular numbers corresponding to sectors obtained by dividing radially BG, GR or RB plane in FIG. 1 by radial lines are stored, and in the memory 10 linear numbers corresponding to a central circle and concentric circles obtained by dividing concentrically the planes in FIG. 1 by concentric circles are stored.

When the signal Bo has the minimum value, the gate signal Bg selects the memory 7 which reads out the angular number corresponding to the sector including the angle a of the vector A according to the values G and R operated, and the memory 10 reads out the linear number corresponding to the concentric circle including the tip of the vector A according to the same. In other words, the small area part including the tip of the vector A corresponding to the combination of the color separation signals Bo, Go and Ro is discriminated by the angle a and the size of the Vector A.

Thus the read-out angular number from the memory 7, corresponding to the angle a of the vector A is sent to memories 12, 13, 14, 15, 16, 17 and 18, and acts there as an address signal to read out the factors stored therein.

The read-out linear number from the memory 10, corresponding to the size of the vector A is sent to the memories 13, 14, 15, 16, 17 and 18, and acts there as an address signal to read out the factors stored therein.

In the memory 12, gain factors to be multiplied to the minimum value of the color separation signals for controlling the color balance are stored in the addresses corresponding to the angular numbers. In the memories 13, 14, 15, and 16, the factors for controlling the hue, i.e.

$$\cos a_1 + \frac{1}{\sqrt{3}} \sin a_1, -\frac{2}{\sqrt{3}} \sin a_1,$$

$$\cos a_1 - \frac{1}{\sqrt{3}} \sin a_1, \text{ and } \frac{2}{\sqrt{3}} \sin a_1,$$

are stored in the addresses corresponding to the angular and the linear numbers.

In the memories 17 and 18, the factors for controlling the saturation, i.e. Cb, Cg and Cr except one thereof corresponding to the minimum color separation signal, are stored in the addresses corresponding to the angular and the linear numbers. For instance, when the signal Bo has the minimum value, the vector A is positioned in the GR plane, and the memories 17 and 18 output Cg and Cr.

Figure 8:
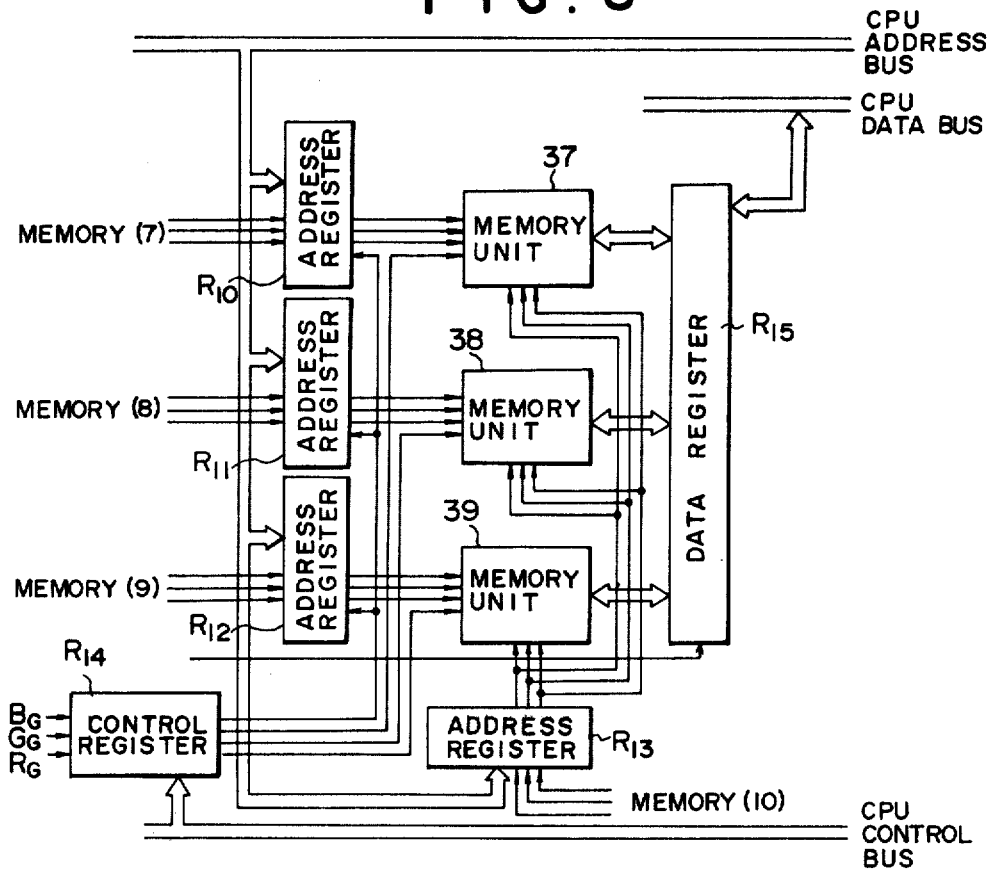
FIG. 8 is a schematic view of the memory in FIG. 6.

There is shown in FIG. 8 an embodiment of the memories 12-18, comprising registers $R_{10}$, $R_{11}$, $R_{12}$, $R_{13}$, $R_{14}$ and $R_{15}$, and memory units 37, 38 and 39 wherein predetermined factors concerning Bg, Gg and Rg planes are stored. The selection of the memory units 37, 38 or 39 is conducted by the gate signal Bg, Gg or Rg. Lines for data bus, address bus and control bus are connected to those of a centrol processing unit hereinafter referred to as CPU. From the information input the CPU determines the necessary factors for the present method, and makes the memory units store the data. A microcomputer, or the like may be used as the CPU.

Then, the factors read out of the memories 12, 13, 14, 15, 16, 17 and 18 are sent to multipliers 19, 20, 21, 22, 23, 26 and 27, respectively.

The data selector 11 sends the color separation signal having the minimum value such as Bo to the multiplier 19, and the other color separation signals Go and Ro to the multipliers 20 and 23; and to ones 21 and 22.

Then, the outputs from the multipliers 20 and 21 such as $$Go\left(\cos a_1 + \frac{1}{\sqrt{3}} \sin a_1\right) \text{ and } -Ro\frac{2}{\sqrt{3}} \sin a_1$$

are fed to an adder 24 which outputs a signal corresponding to $$G_1 = Go\left(\cos a_1 + \frac{1}{\sqrt{3}} \sin a\right) - R\frac{2}{\sqrt{3}} \sin a_1$$

to the multiplier 26. The outputs from the multipliers 22 and 23 such as $$Ro\left(\cos a_1 - \frac{1}{\sqrt{3}} \sin a_1\right) \text{ and } Go\frac{2}{\sqrt{3}} \sin a_1$$

are sent to an adder 25 which outputs a signal corresponding to $$R_1 = Go \frac{2}{\sqrt{3}} \sin a_1 + Ro \left( \cos a_1 - \frac{1}{\sqrt{3}} \sin a_1 \right).$$

In the multipliers 19, 26 and 27, the factors read out of the memories 12, 17 and 18 are multiplied to the outputs from the data selector 11 and the adders 24 and 25, thereby obtaining the color-corrected color separation signals.

In the embodiment described above, the digitalized signals such as Bo, Go, Ro, Bg, Gg, Rg, and the like each requires necessary bit numbers corresponding to its quantized levels and therefore each line appeared in the drawings requires the corresponding numbers. However, in order to simplified the drawings it is drawn in one line, and also each element involved is simplified in the drawings.

Figure 9:
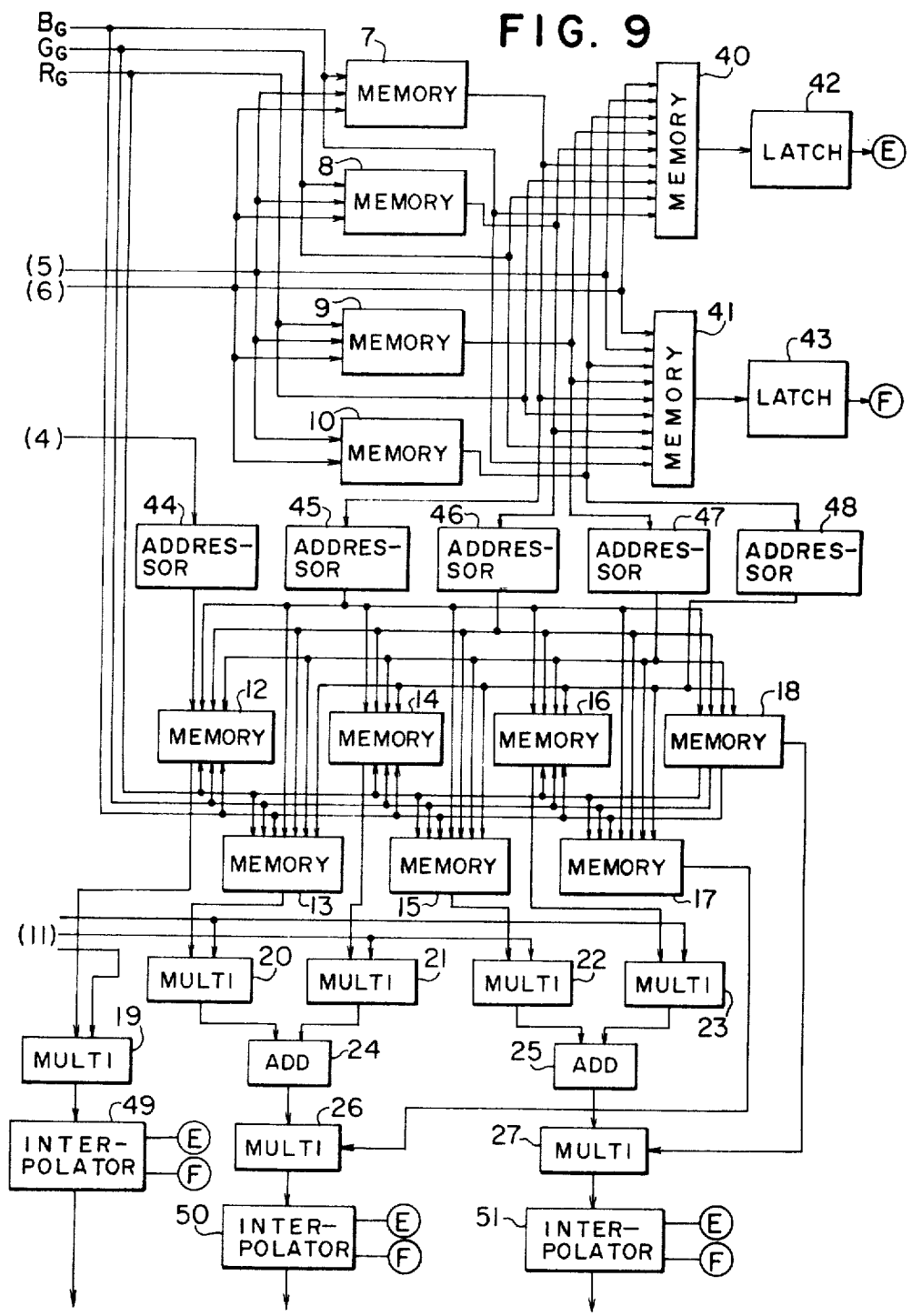
FIG. 9 is a schematic view of another electric circuit for the method of the present invention.

In FIG. 9, there is shown another electric circuit for carrying out the method according to the present invention, which is capable of performing the interpolation described above with reference to FIGS. 4 and 5. This circuit is basically the same as that in FIG. 6 and is further provided with memories 40 and 41, latch circuits 42 and 43, addressor circuits 44–48, and interpolator circuits 49, 50 and 51.

Figure 5:
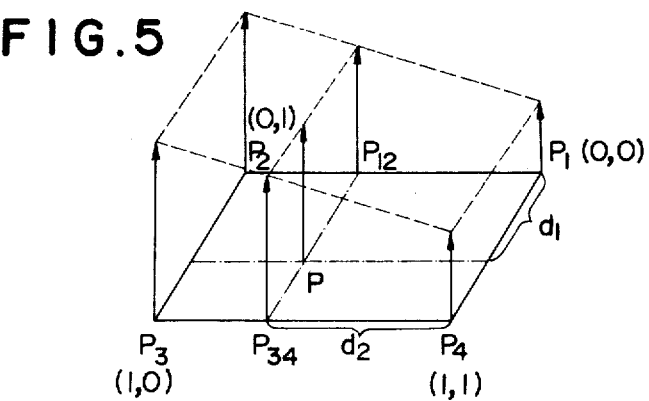
FIG. 5 is a schematic view for explaining an interpolation method applied to the method of the present invention.

In the memories 40 and 41, the predetermined values corresponding to $d_1$ and $d_2$ shown in FIG. 5 are stored in advance. These values are read out of the memories by address signals obtained from the angle a and the size of the vector A, and then are latched in the latch circuits 42 and 43.

The output signals from the signal selector circuit 4 and the memories 7, 8, 9 and 10 are sent to the addressor circuits 44, 45, 46, 47 and 48 which address the memories 12–18 in order to read out the factors corresponding to the small area part wherein the tip of the vector A is located. For instance, the addressor circuits 44–48 are so controlled by timing pulse signals $T_1$ and $T_2$ shown in FIGS. 10a and 10b, that, when the signals $T_1$ and $T_2$ are in low levels L; high and low levels H and L; low and high levels L and H; or high levels H, the address corresponding to $P_1$, $P_2$, $P_3$ or $P_4$ in FIG. 5 may be addressed.

Thus the read-out signals from the memories 12–18 are fed to the interpolation circuits 49, 50 and 51 through the multipliers 19–23, the adders 24 and 25, and the multipliers 26 and 27 in the same manner as described above with reference to FIG. 6. The signals E and F latched in the latch circuits 42 and 43 are sent to the interpolation circuits 49, 50 and 51.

Figure 11:
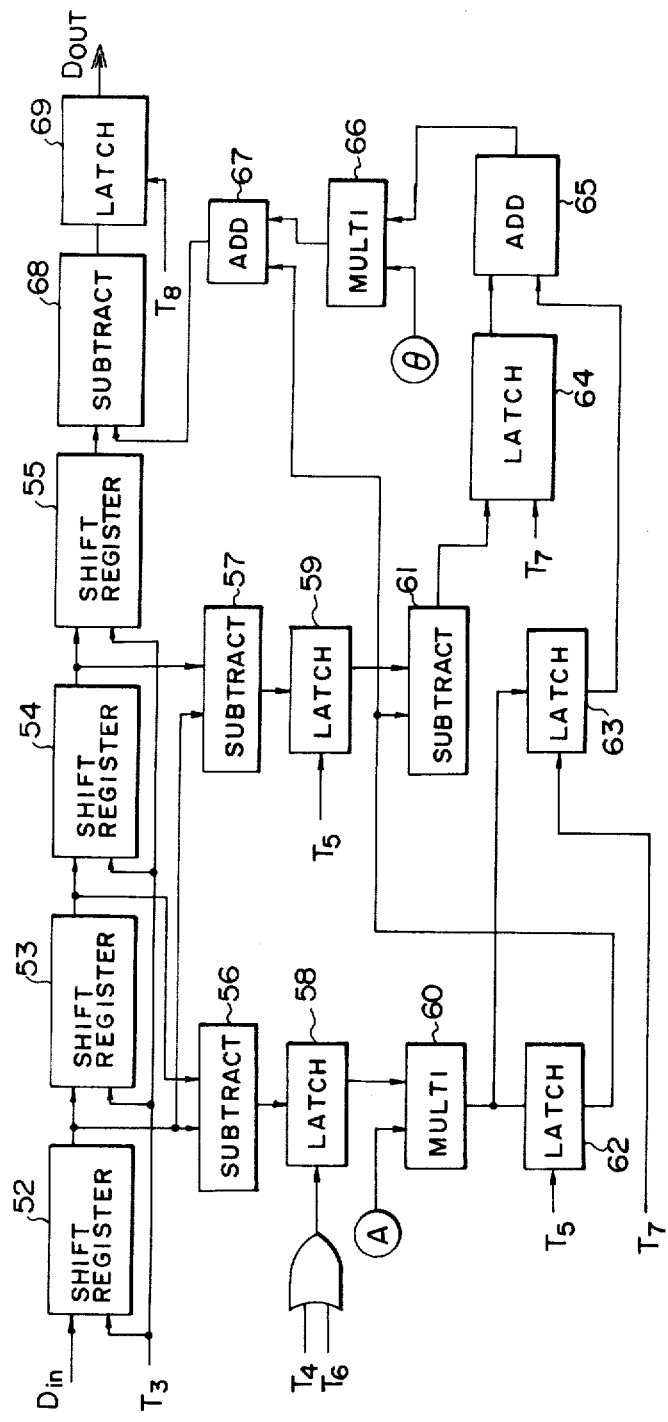
FIG. 11 is a block diagram of the interpolator circuit in FIG. 9.

An embodiment of the interpolator circuits 49, 50 and 51 is shown in FIG. 11, and comprises shift registers 52, 53, 54 and 55, subtractor 56, 57, 61 and 68, adders 65 and 67, multipliers 60 and 66, and latch circuits 58, 59, 62, 63, 64 and 69.

Figure 10:
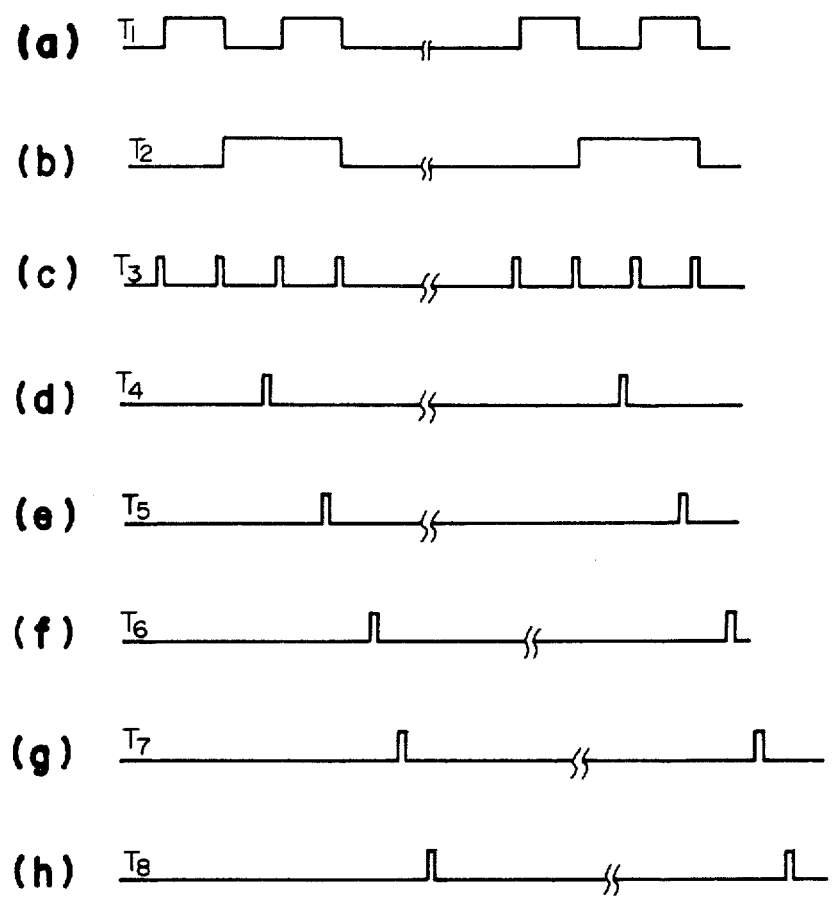
FIGS. 10a–h are timing charts for an interpolator circuit in FIG. 9.

For instance, signals $D_{in}$ output from the multiplier 19 in synchronization with a timing pulse signal $T_3$ shown in FIG. 10c, i.e. U(0,0), U(0,1), U(1,0) and U(1,1) in the formula (27) mentioned above, are input consecutively into the shift registers 51, 53, 54 and 55. While the signals are shifted from one to another, the signals $D_{in}$ are properly picked up and are sent to the subtractors 56 and 57. In the subtractor 56, U(0,0)−U(0,1) and U(1,0)−U(1,1) are calculated, and are fed to the latch circuit 58 by using timing pulse signals $T_4$ and $T_6$ shown in FIGS. 10d and 10f. In the subtractor 57, U(0,0)−U(1,0) is calculated and is sent to the latch circuit 59 by using timing pulse signal $T_5$ shown in FIG. 10e.

U(0,0)−U(0,1) and U(1,0)−U(1,1) are sent from the latch circuit 58 to the multiplier 60 in which they are multiplied by the value $d_2$ lached in the latch circuit 43, thereby obtaining $d_2$[U(0,0)−U(0,1)] and $d_2$[U(1,0)−U(1,1)]. By using the timing pulse signals $T_5$, $d_2$[U(0,0)−U(0,1)] is sent from the multiplier 60 to the latch circuit 62 to latch it, and by using a timing pulse signal $T_7$ shown in FIG. 10g, $d_2$[U(1,0)−U(1,1)] is sent from the multiplier 60 to the latch circuit 63 to latch it.

The latch circuits 59 and 62 output U(0,0)−U(1,0) and $d_2$[U(0,0)−U(0,1)] to the subtractor 61 in which U(0,0)−U(1,0)−$d_2$[U(0,0)−U(0,1)] is obtained and latched in the following latch circuit 64 by using the timing pulse signal $T_7$. From the latch circuits 63 and 64, U(0,0)−U(1,0)−$d_2$[U(0,0)−U(0,1)] and $d_2$[U(1,0)−U(1,1)] are sent to the adder 65 and there U(0,0)−U(1,0)−$d_2$[U(0,0)−U(0,1)]+$d_2$[U(1,0)−U(1,1)] is obtained and is sent to the multiplier 66.

In the multiplier 66 the value $d_1$ is input from the lach circuit 42 and $d_1${[U(0,0)−U(1,0)]−$d_2$[U(0,0)−U(0,1)]+$d_2$[U(1,0)−U(1,1)]} is obtained and sent to the adder 67. Into the adder 67 $d_2$[U(0,0)−U(0,1)] is fed from the latch circuit 62 and there $d_2$[U(0,0)−U(0,1)]+$d_1${[U(0,0)−U(1,0)]−$d_2$[U(0,0)−U(0,1)]+$d_2$[U(1,0)−U(1,1)]} is obtained and is sent to the subtractor 68. From the shift register 55, U(0,0) is sent to the subtractor 68 wherein U(0,0)−$d_2$[U(0,0)−U(0,1)]−$d_1${[U(0,0)−U(1,0)]−$d_2$[U(0,0)−U(0,1)]+$d_2$[U(1,0)−U(1,1)]} is obtained and latched is the following latch circuit 69 by using a timing pulse signal $T_8$ shown in FIG. 10h. Then the latch circuit 69 outputs it as an output signals $D_{out}$.

In the embodiment shown in FIG. 9, the interpolator circuits 49, 50 and 51 are arranged after the multipliers 19, 26 and 27, but they may be arranged just after the memories 12–18 when the factors read out thereof are interpolated.

According to the present invention, it is not always necessary to divide equally the BG, the GR and the RB planes by radial lines and concentric circles.

Although the present invention has been shown and described in terms of preferred embodiments thereof, however, various changes and modifications can be made by those skilled in the art without departing from the scope of the present invention.

What is claimed is:

1. A method for carrying out a color correction in a digital manner, comprising the steps of:
    representing in a curvilinear coordinates system a resultant value corresponding to a combination of color separation signals obtained by photoelectrically scanning a color original picture,
    said representing step including representing said resultant value as a vector extending radially from the center of the coordinates system, wherein the angle of the vector with respect to a standard radial axis, and the size of the vector represent hue and saturation corresponding to the combination of the color signals, and
    transforming the coordinates of the resultant value represented by said vector by operating the color separation signals, thereby obtaining a combination of color corrected color separation signals.

2. The method as claimed in claim 1 wherein the curvilinear coordinates system is divided in circumferential and radial directions into a plurality of small area parts by radial lines and concentric circles, and factors predetermined for operating the transformation of the vector are stored in addresses corresponding to the small area parts in a memory.

3. The method as claimed in claim 2, wherein one of the small area parts, in which the tip of the resultant vector is positioned, is discriminated by angle and the size of the resultant vector, wherein the factors corresponding to the one small area part are read out of the memory, and formed in order to correct the hue and the saturation by operating the color separation signals together with the factors read out, thereby obtaining a combination of color corrected color separation signals.

4. The method as claimed in claim 3, wherein the color corrected color separation signals are interpolated according to the deviations of the position corresponding to the tip of the vector corresponding to the combination of the color corrected color separation signals from the standard values corresponding to the small area part in which the tip of said vector is positioned.

5. The method as claimed in claim 1, 2, 3 or 4, further comprising performing the digital operation in an electronic circuit.

* * * * *